(12) United States Patent
Senegond et al.

(10) Patent No.: US 12,226,799 B2
(45) Date of Patent: Feb. 18, 2025

(54) METHOD OF MANUFACTURING CAPACITIVE MICROMACHINED ULTRASONIC TRANSDUCER (CMUT)

(71) Applicant: VERMON SA, Tours (FR)

(72) Inventors: Nicolas Senegond, Tours (FR); Dominique Gross, Tours (FR); Cyril Meynier, Tours (FR)

(73) Assignee: VERMON SA, Tours (FR)

( * ) Notice: Subject to any disclaimer, the term of this patent is extended or adjusted under 35 U.S.C. 154(b) by 455 days.

(21) Appl. No.: 17/630,059

(22) PCT Filed: Jul. 16, 2020

(86) PCT No.: PCT/IB2020/000617
§ 371 (c)(1),
(2) Date: Jan. 25, 2022

(87) PCT Pub. No.: WO2021/019296
PCT Pub. Date: Feb. 4, 2021

(65) Prior Publication Data
US 2022/0274133 A1    Sep. 1, 2022

Related U.S. Application Data

(60) Provisional application No. 62/879,056, filed on Jul. 26, 2019.

(51) Int. Cl.
*H01G 7/00* (2006.01)
*B06B 1/02* (2006.01)

(52) U.S. Cl.
CPC ................... *B06B 1/0292* (2013.01)

(58) Field of Classification Search
CPC .... H04R 19/005; B06B 1/0292; G01L 9/0073
See application file for complete search history.

(56) References Cited

U.S. PATENT DOCUMENTS 7,839,722 B2 * 11/2010 Wagner ................. B81B 3/0021
367/181
8,371,018 B2 * 2/2013 Chang ................... B06B 1/0292
310/309

(Continued)

FOREIGN PATENT DOCUMENTS

CN        102620864 A       8/2012
WO     2009/037655 A2      3/2009
(Continued)

OTHER PUBLICATIONS

European Patent Office, International Search Report issued in corresponding Application No. PCT/IB2020/000617, mailed Nov. 17, 2020.

(Continued)

*Primary Examiner* — Paul D Kim
(74) *Attorney, Agent, or Firm* — Stites & Harbison, PLLC; Jeffrey A. Haeberlin

(57) ABSTRACT

A method of manufacturing a capacitive micromachined ultrasonic transducer (CMUT) includes the steps of: a) forming a first dielectric layer on a first substrate; b) forming a second dielectric layer on a second substrate; c) forming a cavity in the first or second dielectric layer; d) assembling the first and second substrates by direct bonding of the surface of the second dielectric layer opposite to the second substrate to the surface of the first dielectric layer opposite to the first substrate; e) removing the second substrate to only keep above the cavity a suspended membrane formed by the second dielectric layer; and f) forming an upper electrode on the surface of the membrane opposite to the first substrate.

8 Claims, 2 Drawing Sheets

(56) References Cited

U.S. PATENT DOCUMENTS

| | | | |
|---|---|---|---|
| 10,850,306 B2* | 12/2020 | Rothberg | G01N 29/2406 |
| 2006/0004289 A1 | 1/2006 | Tian et al. | |
| 2007/0161896 A1* | 7/2007 | Adachi | B06B 1/0292 |
| | | | 600/437 |
| 2007/0167812 A1 | 7/2007 | Lemmerhirt et al. | |
| 2009/0080292 A1 | 3/2009 | Wagner et al. | |
| 2017/0050217 A1* | 2/2017 | Johnson | H02N 1/008 |
| 2018/0243792 A1 | 8/2018 | Rothberg et al. | |

FOREIGN PATENT DOCUMENTS

| | | |
|---|---|---|
| WO | 2010/032156 A2 | 3/2010 |
| WO | 2013/136212 A1 | 9/2013 |

OTHER PUBLICATIONS

European Patent Office, Written Opinion issued in corresponding Application No. PCT/IB2020/000617, mailed Nov. 17, 2020.
Huang, Y., et al. "Fabricating capacitive micromachined ultrasonic transducers with wafer-bonding technology," Journal of Microelectromechanical Systems, vol. 12, No. 2, Apr. 1, 2003, pp. 128-137.

* cited by examiner

METHOD OF MANUFACTURING CAPACITIVE MICROMACHINED ULTRASONIC TRANSDUCER (CMUT)

TECHNICAL BACKGROUND

The present disclosure generally relates to the field of ultrasound transducers and, more particularly, to that of capacitive micromachined ultrasonic transducers, also called CMUTs.

PRIOR ART

Conventionally, a CMUT comprises a flexible membrane suspended above a cavity, a first electrode, called lower or bottom electrode, located on the side of the cavity opposite to the membrane, and a second electrode, called upper or top electrode, located on the side of the cavity opposite to the first electrode and rigidly attached to the flexible membrane. When an appropriate excitation voltage is applied between the lower and upper electrodes of the transducer, the flexible membrane starts vibrating under the effect of the electrostatic force applied between the lower and upper electrodes, and emits an ultrasound acoustic wave. Conversely, when the transducer receives an acoustic wave in a given frequency range, the flexible membrane starts vibrating, which results in the appearing of a voltage between the lower and upper electrodes of the transducer under the effect of the capacitance variation between the electrodes.

A CMUT is conventionally coupled to an electronic control circuit configured to, during a transmission phase, apply an excitation voltage between the transducer electrodes, to cause the transmission of an ultrasound wave by the transducer and, during a reception phase, read the voltage generated between the lower and upper electrodes of the transducer under the effect of the received acoustic wave.

To prevent an electrical short-circuits between the bottom electrode and the top electrode, particularly in the case the membrane is collapsed down to the bottom of the CMUT cavity, the electrodes can be separated by an insulating material. The insulating material can be a layer extending over the bottom electrode surface or under the top electrode surface, as taught for example by WO2018095937. Alternatively, in some embodiments such as in WO2007015218, the insulation material forms post shapes with dimensions smaller than the electrode surface dimensions. However, a drawback is that such insulating material is subject to electrical charge trapping due to the elevated electrical fields in the CMUT cavity. To reduce the charge migration, WO2010032156 for example discloses charge migration barriers comprising several layers of dielectric materials having different bandgaps.

It would be desirable to have a CMUT structure and a method of manufacturing such a structure, overcoming all or part of the disadvantages of known CMUT structures and manufacturing methods.

SUMMARY

To achieve this, an embodiment provides a method of manufacturing a CMUT, comprising the steps of:
  a) forming a first dielectric layer on the side of a surface of a first substrate;
  b) forming a second dielectric layer on the side of a surface of a second substrate;
  c) forming a cavity in the first or second dielectric layer;
  d) after steps a), b), and c), assembling the first and second substrates by direct bonding of the surface of the second dielectric layer opposite to the second substrate to the surface of the first dielectric layer opposite to the first substrate;
  e) after step d), removing the second substrate to only keep above the cavity a suspended membrane formed by the second dielectric layer; and
  f) after step e), forming an upper electrode on the surface of the membrane opposite to the first substrate.

According to an embodiment, step f) comprises a step of deposition of a first metal layer on top of and in contact with the surface of the membrane opposite to the first substrate, followed by a step of deposition of a second metal layer on top of and in contact with the surface of the first metal layer opposite to the membrane.

According to an embodiment, the first metal has a work function higher than the work function of the second metal layer.

According to an embodiment, the first metal layer has a work function higher than 4.2 eV.

According to an embodiment, the first metal layer comprises an alloy of titanium and of tungsten.

According to an embodiment, the second metal layer comprises an alloy of aluminum and of copper.

According to an embodiment, step f) comprises a step of local removal of first and second metal layers to localize the upper electrode opposite the cavity.

According to an embodiment, at step c), the second dielectric layer is formed by oxidation of a portion of the thickness of the second substrate.

According to an embodiment, the first substrate is made of a doped semiconductor material and forms a lower electrode of the transducer.

According to an embodiment, the first and second substrates are made of silicon, and the first and second dielectric layers are made of silicon oxide.

According to an embodiment, the cavity formed at step b) in the first dielectric layer is through, that is, it emerges onto the upper surface of the first substrate.

According to an embodiment, at step c), the cavity is formed in the first dielectric layer and is non-through.

Another embodiment provides a CMUT comprising:
  a first substrate;
  a first dielectric layer coating the upper surface of the first substrate;
  a cavity located in or above the first dielectric layer;
  a membrane made of a dielectric material suspended above the cavity; and
  an upper electrode on the upper surface of the membrane.

According to an embodiment, the upper electrode comprises a stack of a first metal layer arranged on top of and in contact with the upper surface of the membrane, and of a second metal layer arranged on top of and in contact with the upper surface of the first metal layer.

According to an embodiment, the first metal has a work function higher than the work function of the second metal layer.

According to an embodiment, the first metal layer has a work function higher than 4.2 eV.

According to an embodiment, the first metal layer comprises an alloy of titanium and of tungsten.

According to an embodiment, the upper electrode is located opposite the cavity.

According to an embodiment, the first substrate is made of a doped semiconductor material and forms a lower electrode of the transducer.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various possible applications of the described transducers have not been detailed, the described embodiments being compatible with usual applications of ultrasound transducers, particularly in ultrasound imaging devices. Further, the circuits for controlling the described transducers have not been detailed, the described embodiments being compatible with all or most known CMUT control circuits.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
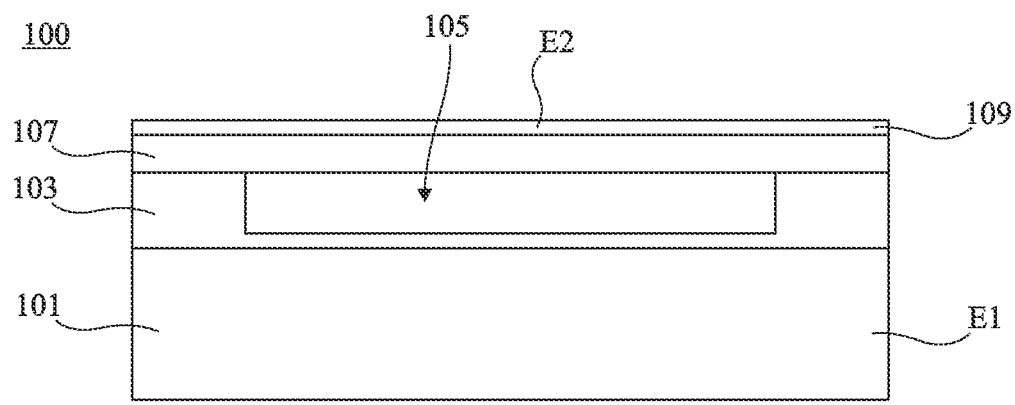
FIG. 1 is a cross-section view schematically showing an example of a CMUT.

FIG. 1 is a cross-section view schematically showing an example of a CMUT 100 (also referred to as transducer 100).

Transducer 100 comprises a doped semiconductor layer 101, for example, made of silicon, defining a lower electrode E1 of the transducer.

Semiconductor layer 101 is coated, on its upper surface side, with a rigid support layer 103 made of a dielectric material, for example, silicon oxide. In the example, layer 103 is in contact, by its lower surface, with the upper surface of semiconductor layer 101.

Transducer 100 further comprises a cavity 105 formed in layer 103. Cavity 105 extends vertically from the upper surface of layer 103, towards its lower surface. In the shown example, cavity 105 is non-through, that is, it does not emerge on the lower surface side of layer 103. In other words, a lower portion of the thickness of layer 103 coats the upper surface of electrode 101 at the bottom of cavity 101.

As an example, the depth of cavity 105 (vertical dimension in the orientation of FIG. 1) is in the range from 20 nm to 5 µm, for example in the range from 50 nm to 1 µm. The lateral dimensions of cavity 105 are for example in the range from 5 µm to 500 µm.

Transducer 100 further comprises a flexible membrane 107 suspended above cavity 105. In this example, membrane 107 is made of a semiconductor material, for example, of silicon. Membrane 107 extends above cavity 105 and is attached, at the periphery of cavity 105, by its lower surface, to the upper surface of dielectric layer 103. As an example, the lower surface of membrane 107 is directly in contact with the upper surface of dielectric layer 103 at the periphery of cavity 105.

Transducer 100 further comprises, above membrane 107, a conductive layer 109, for example, a metal layer, defining an upper electrode E2 of the transducer. Conductive layer 109 for example extends over substantially the entire upper surface of membrane 107. In the shown example, conductive layer 109 is in contact, by its lower surface, with the upper surface of membrane 107.

Transducer 100 may be coupled to an electronic control circuit CTRL, not detailed, connected to its lower and upper electrodes E1 and E2, configured to, during a transmission phase, apply an excitation voltage between electrodes E1 and E2 and, during a reception phase, read a voltage between electrodes E1 and E2. As an example, the control circuit may be configured to, during transmission and/or reception phases, apply a DC bias voltage between electrodes E1 and E2. During transmission phases, the control circuit further applies between electrodes E1 and E2 an AC excitation voltage superposed to the DC bias voltage, to cause a vibration of membrane 107 resulting in the transmission of an ultrasound acoustic wave. During reception phases, an AC voltage superposed to the DC bias voltage appears between electrodes E1 and E2 under the effect of the received acoustic wave. The AC voltage is read by the control circuit.

When the voltage applied between electrodes E1 and E2 of the transducer exceeds, in absolute value, a given threshold, called collapse threshold, collapse voltage or pull-in voltage, flexible membrane 107 is capable of coming into contact, by its lower surface, with the bottom of cavity 105, in a central region (in top view) of cavity 105. In this position, called collapsed, of the membrane, the portion of dielectric layer 103 located at the bottom of cavity 105 enables to avoid a short-circuit between electrodes E1 and E2 of the transducer (via semiconductor membrane 107).

A limitation of the structure of FIG. 1 is that, in collapsed position of membrane 107, a strong electric field, for example an electric field of around 2 MV/cm or above, is generated in the portion of dielectric layer 103 in contact with membrane 107 at the bottom of cavity 105. This may cause an injection of electric charges in dielectric layer 103 at the bottom of cavity 105. The charges may induce a modification of the bias voltages required to drive the transducer. In certain conditions, this electric field may result in causing a breakdown of dielectric layer 103 at the bottom of cavity 105.

Another limitation of the structure of FIG. 1 is due to the fact that semiconductor membrane 107 and conductive layer 109 extend not only above cavity 105, but also above the periphery of cavity 105. This results in an unwanted parasitic capacitive coupling between layers 109 and 101, at the periphery of cavity 105. This may result in degrading the quality of the measurements performed by means of the transducer.

Figure 2:
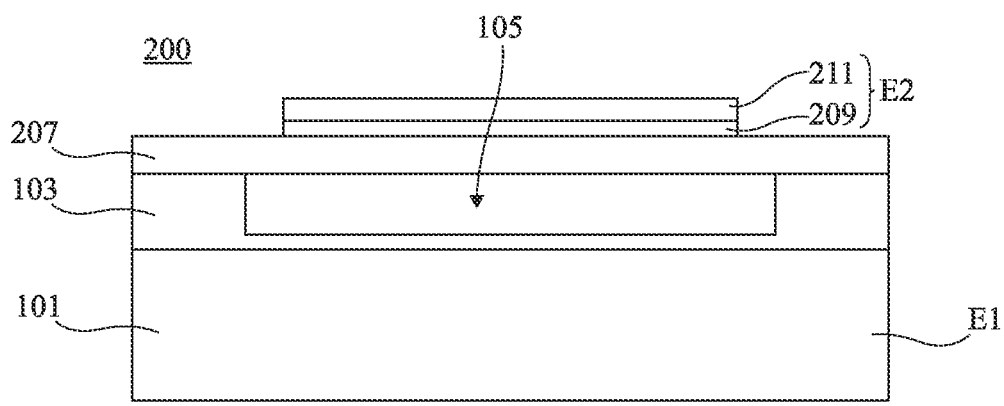
FIG. 2 is a cross-section view schematically showing an example of a CMUT according to an embodiment.

FIG. 2 is a cross-section view schematically showing an example of a CMUT 200 (also referred to as transducer 200) according to an embodiment.

The transducer 200 of FIG. 2 comprises elements common with the transducer 100 of FIG. 1. These elements will not be detailed again hereafter. In the rest of the description, only the differences with respect to the transducer 100 of FIG. 1 will be highlighted.

The transducer 200 of FIG. 2 differs from the transducer 100 of FIG. 1 in that, in transducer 200, the semiconductor membrane 107 of transducer 100 is replaced with a membrane 207 made of a dielectric material, for example, silicon oxide. As the membrane 107 of transducer 100, the membrane 207 of transducer 200 extends above cavity 105 and is attached, at the periphery of cavity 105, by its lower surface, to the upper surface of dielectric layer 103. The lower surface of membrane 207 is for example directly in contact with the upper surface of dielectric layer 103 at the periphery of cavity 105. The thickness of dielectric membrane 207 is for example in the range from 100 nm to 10 µm.

Transducer 200 further comprises, above membrane 207, to replace the conductive layer 109 of transducer 100, a stack of a layer 209 made of a first conductive material and of a layer 211 made of a second conductive material different from the first material. Layer 209 is in contact, by its lower surface, with the upper surface of membrane 207. Layer 211 is in contact, by its lower surface, with the upper surface of layer 209. It should in particular be noted that, in this example, layer 211 is not directly in contact with membrane 207.

The stack of conductive layers 209 and 211 defines an upper electrode E2 of the transducer.

In this example, layers 209 and 211 are located opposite a central portion of membrane 207, located opposite cavity 105. In other words, at least a portion of the upper surface of the peripheral walls of suspension of membrane 207, formed by the region of dielectric layer 103 located at the periphery of cavity 105, is not topped with conductive layers 209 and 211.

The transducer 200 of FIG. 2 may be controlled identically or similarly to what has been previously described in relation with FIG. 1.

It should be noted that as a variation (not shown), the dielectric layer portion 103 remaining at the bottom of cavity 105 may be removed. In other words, cavity 105 may be a through cavity and emerge onto the upper surface of layer 101. Indeed, in the embodiment of FIG. 2, membrane 207 being made of a dielectric material, the risk of short-circuit between electrodes E1 and E2 in collapsed position of the membrane is avoided.

Preferably, layer 209 is made of a metal having a high work function, for example a work function higher than 4.2 eV, to maximize the potential barrier between conductive layer 209 and dielectric membrane 207, and thus avoid charge injections into membrane 207, particularly in the collapsed position of the membrane. Preferably, layer 209 is made of a metal having a higher work function than the metal of layer 211. In a preferred embodiment, layer 209 is made of an alloy of titanium and tungsten (TiW). As a variation, layer 209 can be made of silver (Ag), nickel (Ni), palladium (Pd), gold (Au), platinum (Pt), or of an alloy of one or a plurality of these metals.

Layer 211 may be made of a metal selected to increase the electrical conductivity of the upper electrode. Preferably, layer 211 is made of a metal having a higher electrical conductivity (lower resistivity) than the metal of layer 209. As an example, layer 211 is made of an alloy of aluminum and copper (AlCu). As a variation, layer 211 can be made of gold silver (Ag), gold (Au), aluminum (Al), copper (Cu), (nickel (Ni), palladium (Pd), or of an alloy of one or a plurality of these metals.

As a variation (not shown), an intermediate layer made of a metal having a work function lower than the work function of the metal of layer 209 and higher that the work function of the metal of layer 211 can be provided between layer 209 and layer 211.

An advantage of the transducer 200 of FIG. 2 over the transducer 100 of FIG. 1 is that the electric nature of the flexible membrane 207 of transducer 200 enables to avoid phenomena of charge injection at the bottom of cavity 105, in the collapsed position of the membrane.

Another advantage, due to the location of upper electrode E2 opposite cavity 105 and to the dielectric nature of membrane 207, is a significant decrease, or even a suppression, of the lateral parasitic capacitance between electrodes E1 and E2 of the transducer at the periphery of cavity 105. This also reduces the parasitic capacitance between adjacent cavities. This enables to improve the quality of the measurements performed by means of the transducer.

FIGS. 3A to 3E are cross-section views illustrating successive steps of an example of a method of manufacturing a CMUT of the type described in relation with FIG. 2. Although a single CMUT is shown in the drawings, in practice, a plurality of identical or similar transducers may be simultaneously monolithically formed on a same chip.

Figure 3A:
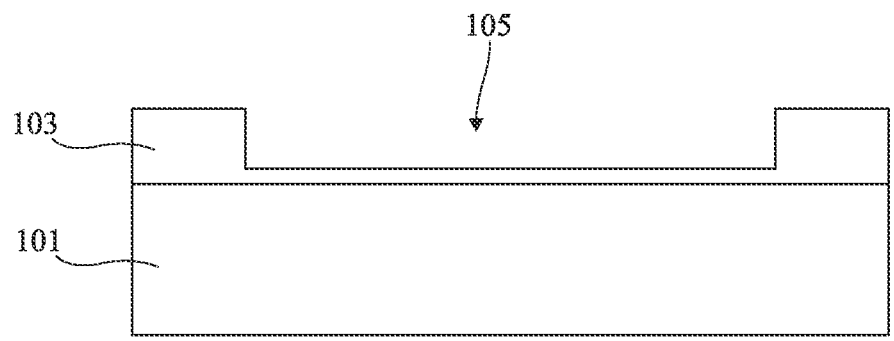
FIGS. 3A, 3B, 3C, 3D, and 3E are cross-section views illustrating steps of an example of a method of manufacturing a CMUT according to an embodiment.

FIG. 3A illustrates the structure obtained at the end of the successive steps of:

forming dielectric layer 103 on the upper surface side of semiconductor layer 101; and forming cavity 105 on the upper surface side of layer 103.

Layer 101 for example corresponds to a first substrate made of a semiconductor material, for example, a silicon substrate.

Layer 103 may be formed by oxidation of an upper portion of substrate 101, for example, according to a dry thermal oxidation method. As a variation, layer 103 may be formed by deposition of a dielectric material, for example, silicon oxide, on the upper surface of substrate 101.

Cavity 105 may be formed by local etching from the upper surface of dielectric layer 103, for example, by plasma etching. As indicated hereabove in relation with FIG. 2, cavity 105 may be through, that is, emerge onto the upper surface of layer 101, or non-through, as shown in FIG. 3A.

Figure 3B:
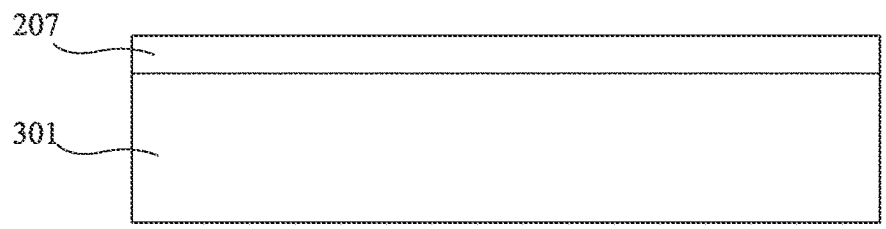

FIG. 3B illustrates the structure obtained at the end of a step of forming of a dielectric layer 207, corresponding to the future flexible membrane of the transducer, on the upper surface side of a second substrate 301.

Substrate 301 may be a semiconductor substrate, for example, a silicon substrate. Layer 207 may be formed by oxidation of an upper portion of substrate 301, for example, according to a dry thermal oxidation method. As a variation, layer 207 may be formed by deposition of a dielectric material, for example, silicon oxide, on the upper surface of substrate 301.

Figure 3C:
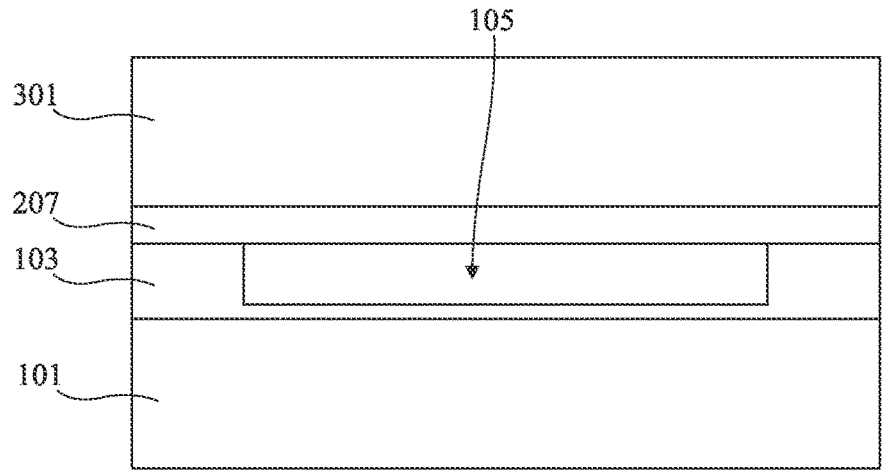

FIG. 3C illustrates the structure obtained at the end of a step of transferring the structure of FIG. 3B onto the structure of FIG. 3A. During the transfer, the surface of dielectric layer 207 opposite to substrate 301 (that is, its lower surface in the orientation of FIG. 3C) faces the surface of dielectric layer 103 opposite to substrate 101 (that is, its upper surface in the orientation of FIG. 3C). The structure of FIG. 3B is attached to the structure of FIG. 3A by direct bonding or molecular bonding of the surface of dielectric layer 207 opposite to substrate 301 to the surface of dielectric layer 103 opposite to substrate 101. The bonding can be performed under vacuum, or under any atmosphere. Cavity 105 is thus closed, on its upper surface side, by dielectric layer 207.

Figure 3D:
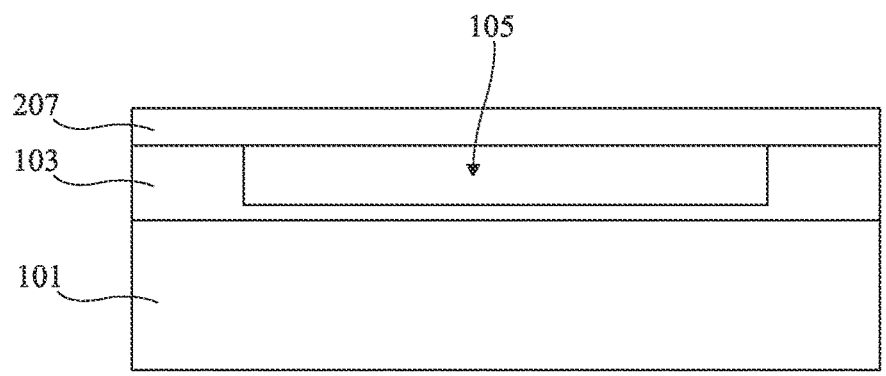

FIG. 3D illustrates the structure obtained at the end of a subsequent step of removal of substrate 301. Substrate 301 is for example removed by grinding from its surface opposite to dielectric layer 207. At the end of this step, only dielectric layer 207 is kept above the structure of FIG. 3A, forming the flexible membrane of the transducer.

Figure 3E:
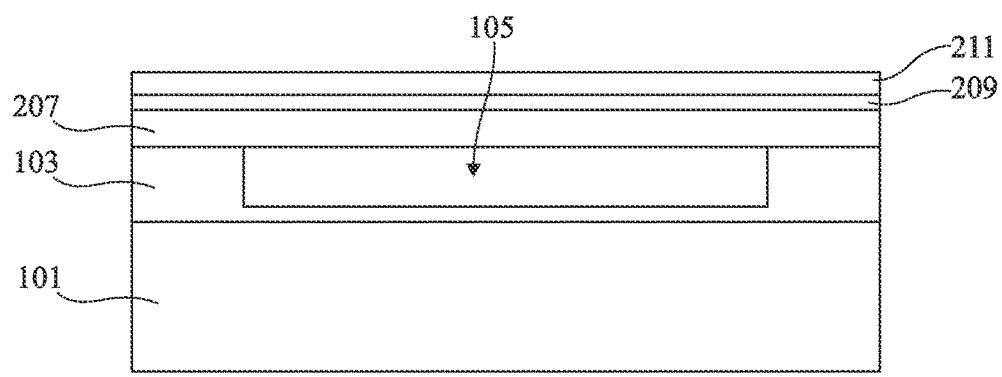

FIG. 3E illustrates the structure obtained at the end of the successive steps of:
  depositing conductive layer 209 on top of and in contact with the upper surface of dielectric membrane 207; and
  depositing conductive layer 211 on top of and in contact with the upper surface of layer 209.

As an example, each of layers 209 and 211 is deposited continuously and with a uniform thickness over substantially the entire upper surface of the structure (non-local depositions).

A subsequent step of local removal of layers 209 and 211, for example, by photolithography and etching, may then be implemented to delimit upper electrode E2, to obtain a structure such as illustrated in FIG. 2.

As a variation (not shown), the cavity 105 may be formed by etching part of the thickness of the dielectric layer 207 coating the substrate 301 at the step of FIG. 3B, before the bonding step of FIG. 3C.

Various embodiments and variants have been described. Those skilled in the art will understand that certain features of these various embodiments and variants may be combined, and other variants will occur to those skilled in the art. In particular, the described embodiments are not limited to the examples of dimensions or to the examples of materials mentioned in the present disclosure.

What is claimed is:

1. A method of manufacturing a capacitive micromachined ultrasonic transducer (CMUT), comprising the steps of:
  a) forming a first silicon oxide layer on a side of a surface of a first substrate;
  b) forming a second silicon oxide layer on a side of a surface of a second substrate;
  c) forming a cavity in the first silicon oxide layer or the second silicon oxide layer;
  d) after steps a), b), and c), assembling a first structure formed in step a) comprising the first substrate and the first silicon oxide layer with a second structure formed in step b) comprising the second substrate and the second silicon oxide layer, by direct bonding of a surface of the second silicon oxide layer opposite to the second substrate to a surface of the first silicon oxide layer opposite to the first substrate;
  e) after step d), removing the second substrate to only keep above the cavity a suspended membrane formed by the second silicon oxide layer; and
  f) after step e), forming an upper electrode on a surface of the suspended membrane opposite to the first substrate, wherein step f) comprises a step of deposition of a first metal layer on top of and in contact with the surface of the suspended membrane opposite to the first substrate, followed by a step of deposition of a second metal layer on top of and in contact with a surface of the first metal layer opposite to the suspended membrane, followed by a step of local removal of portions of the first metal layer and the second metal layer to localize the upper electrode opposite the cavity, wherein the first metal layer has a work function higher than a work function of the second metal layer, and wherein the first substrate is made of a doped semiconductor material and forms a lower electrode of the CMUT.

2. The method according to claim 1, wherein the first metal layer has a work function higher than 4.2 eV.

3. The method according to claim 1, wherein the first metal layer comprises an alloy of titanium and of tungsten.

4. The method according to claim 1, wherein the second metal layer comprises an alloy of aluminum and of copper.

5. The method according to claim 1, wherein, at step b), the second silicon oxide layer is formed by oxidation of a portion of a thickness of the second substrate.

6. The method according to claim 1, wherein the first and second substrates are made of silicon.

7. The method of claim 1, wherein the cavity formed at step c) in the first silicon oxide layer is through, that is, it emerges onto the upper surface of the first substrate.

8. The method according to claim 1, wherein at step c), the cavity is formed in the first silicon oxide layer and is non-through.

\* \* \* \* \*